C. D. House,

Peach Parer.

No. 93,887. Patented Aug. 17, 1869.

Witnesses.
John Aldrich
C. P. S. Murdwell.

Inventor.
Charles D. House

United States Patent Office.

CHARLES D. HOUSE, OF LAKE VILLAGE, NEW HAMPSHIRE.

Letters Patent No. 93,887, dated August 17, 1869.

IMPROVED FORK FOR PEACH-PARERS.

The Schedule referred to in these Letters Patent and making part of the same.

*To all whom it may concern:*

Be it known that I, CHARLES D. HOUSE, of Lake Village, in the county of Belknap, and State of New Hampshire, have invented a new and useful Improvement in Machines for Paring Peaches; and I do hereby declare that the following is a full and exact description thereof, reference being had to the accompanying drawings, and to the letters of reference marked thereon.

The nature of my invention consists in combining two hinged forks with springs, in such a manner, that when thrust into a peach, the tines or prongs shall, by means of the spring, grasp the peach-stone firmly, like forceps, and hold the peach during the process of paring.

To enable others skilled in the art to make and use my invention, I will proceed to describe its construction and operation.

Figure 3:
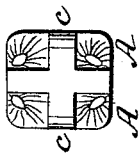
Figure 3 is an end view, showing the four tines of the two forks.
Figure 2:
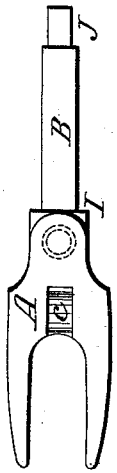
Figure 2 shows the sides of the forks (both alike.)
Figure 1:
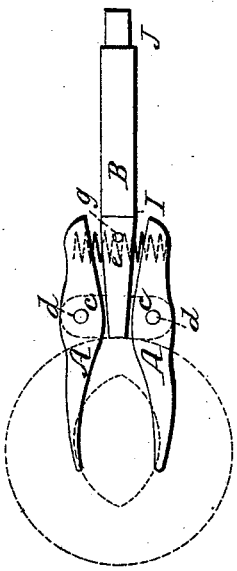
Figure 1 is an edge view, showing the edges of the two forks A A, while holding a peach ready for paring.

A A, fig. 1, are two forks, of two tines each. The tines of each fork are curved inward toward the other fork.

These forks are hinged to the spindle B, by ears $c\ c$, which are a part of B, and enter corresponding slots in the forks, and are held by pins $d\text{-}d$.

$e$ is a spiral spring, extending from one fork to the other, passing through the spindle B, the ends resting in recesses formed from the inner side of the forks.

A pin, $g$, passes through the spindle B, and between the coils of the spring $e$, to keep it in place; consequently it operates like two springs.

If preferred, recesses may be formed in the sides of the spindle B, to receive the ends of two springs instead of one, as shown.

The spindle B, from I to J, is round, and forms the journals on which it revolves. The smaller part, J, is to receive the pinion-gear, the same as is used in apple-paring machines in common use.

This compound fork can be applied to apple-paring machines in common use, by substituting it in place of the fork for apples, thus making the ordinary apple-paring machines available for paring peaches.

The operation is as follows:

Press upon the forks A A with the thumb and forefinger, immediately over the spring $e$, to open the forks sufficiently to receive the stone of the peach; then press the peach upon the forks and release the hold upon the forks, when the springs will force the tines of the forks closely upon the stone of the peach, and the tines being curved will hold it firmly, like forceps, when the operation of paring may be performed successfully in the same manner as upon an apple. The construction of this fork is such that it will adjust itself to, and securely hold any-size peach.

I contemplate the following modifications, as embodying the same principle, viz, three single tines or prongs may be placed equidistant around spindle B, and hinged as described, and forced together by springs, the same as the forks shown; or, instead of springs, the spindle B may be rounded as far as the ears $c\ c$, and a cone may be used to slide on the spindle and forced under the ends of the tines or prongs by a spiral spring round the spindle, and thus close the tines, all at once, by operating like a wedge under the inner end of each prong.

In the plan shown, one fork may be stationary, one only being hinged; also in the modified plan, one or even two of the prongs may be stationary, if preferred. But I prefer, in both cases, to hinge them all, as it will bring the centre of different-sized peaches nearer on the line of the axis of the spindle, and thus operate better in paring.

I do not claim hinging and giving elastic pressure to one of the tines of a single fork; but

What I claim as my invention, and desire to secure by Letters Patent, is—

The two forks A A, hinged to the spindle B, and pressed toward each other by a spring or springs, $e$, substantially as and for the purpose herein specified.

CHARLES D. HOUSE.

Witnesses:
JOHN ALDRICH,
C. P. S. WARDWELL.